United States Patent [19]

Camus

[11] Patent Number: 4,627,510

[45] Date of Patent: Dec. 9, 1986

[54] HYDRAULIC ASSISTED STEERING FOR MOTOR VEHICLES

[75] Inventor: Gérard Camus, Cormeilles-en-Parisis, France

[73] Assignees: Automobiles Peugeot, Paris; Automobiles Citroen, Neuilly sur Seine, both of France

[21] Appl. No.: 684,903

[22] Filed: Dec. 21, 1984

[30] Foreign Application Priority Data

Dec. 23, 1983 [FR] France ................. 83 20977

[51] Int. Cl.⁴ ............................................. B62D 5/08
[52] U.S. Cl. .................................... 180/148; 180/143; 180/147
[58] Field of Search ............... 180/148, 133, 146, 147, 180/141, 149

[56] References Cited

U.S. PATENT DOCUMENTS

| | | | |
|---|---|---|---|
| 3,791,475 | 2/1974 | Cadiou | 180/148 |
| 3,897,845 | 8/1975 | Von Löwis | 180/148 |
| 4,003,446 | 1/1977 | Fleury | 180/148 |

FOREIGN PATENT DOCUMENTS

| | | | |
|---|---|---|---|
| 94857 | 7/1980 | Japan | 180/148 |
| 122258 | 8/1983 | Japan | 180/148 |

Primary Examiner—John J. Love
Assistant Examiner—Everett G. Diederiks, Jr.
Attorney, Agent, or Firm—Karl F. Ross; Herbert Dubno

[57] ABSTRACT

Hydraulic assisted steering for a motor vehicle comprising a control shaft (1) mounted for rotation in a casing (2) and connected to the steering wheel, a follower shaft (3) also mounted for pivoting in this casing and connected mechanically to a pinion (4) engaged with the steering rack (5) resilient means connecting the control shaft (1) and the follower shaft (3) together so that there is produced a relative angular movement of the two shafts when a torque is exerted on the control shaft (1) a hydraulic valve (13 or 13a-13b) responsive to this relative movement, and an assisting cylinder (10) in the supply line of which the valve is inserted and whose mobile element is connected to the rack (5).

The resilient means connecting the control shaft (1) and the follower (3) together and detecting the torque exerted on the control shaft comprise a first endmost transmission element (17 or 17a) interlocked in rotation with the control shaft (1), a second endmost transmission element (18 or 18a) interlocked in rotation with the follower shaft (3) and coaxial with the first one, and a third intermediate transmission element (22) which is coaxial with the first two and connected peripherally thereto by flexible blades (23 and 26) directed obliquely, in one direction for the first endmost element and in the opposite direction for the second one; the intermediate element (22) is connected to the slide (31) of the valve. FIG. 2.

11 Claims, 8 Drawing Figures

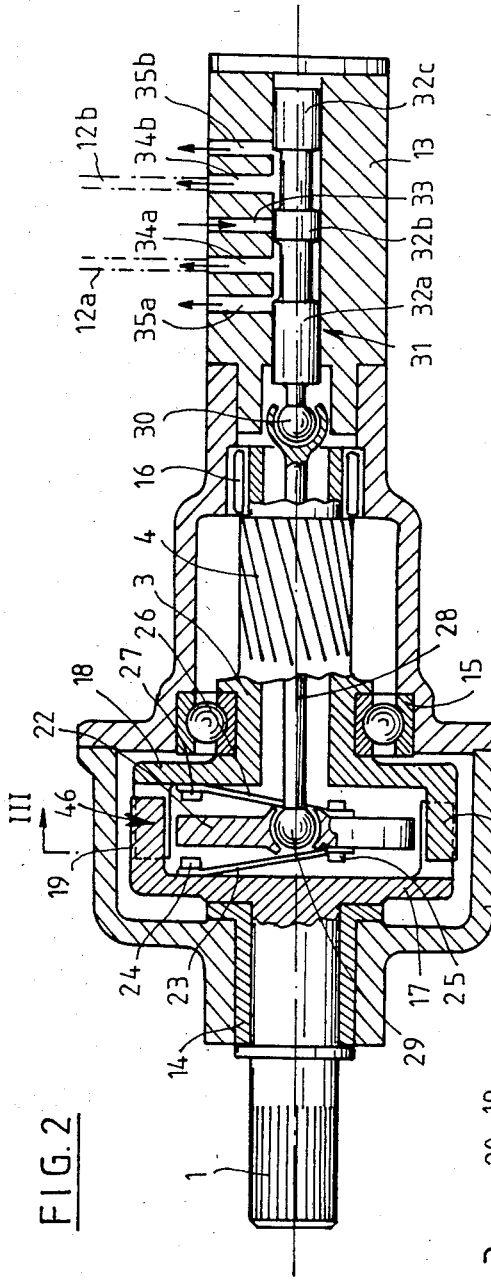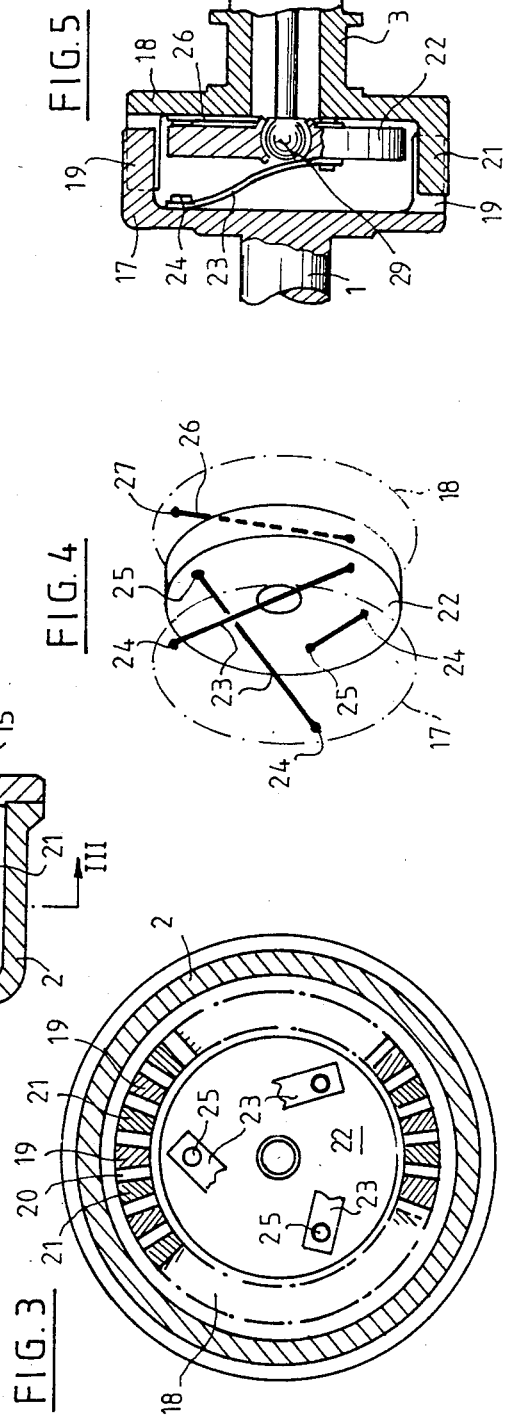

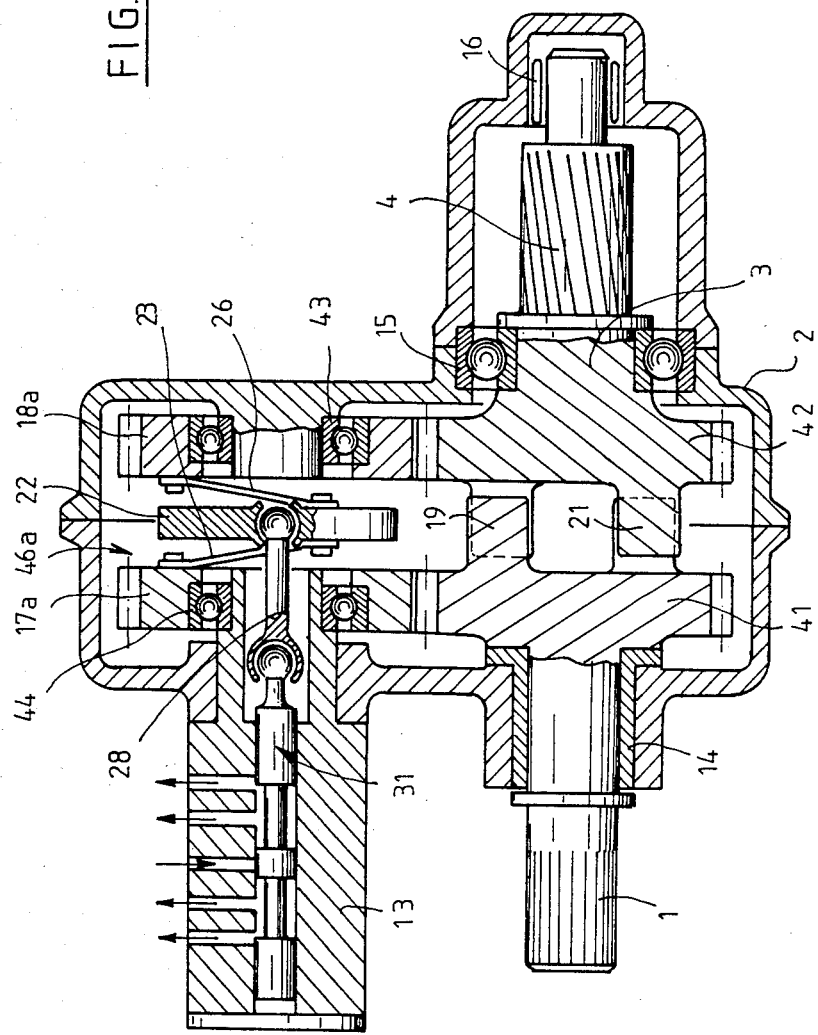

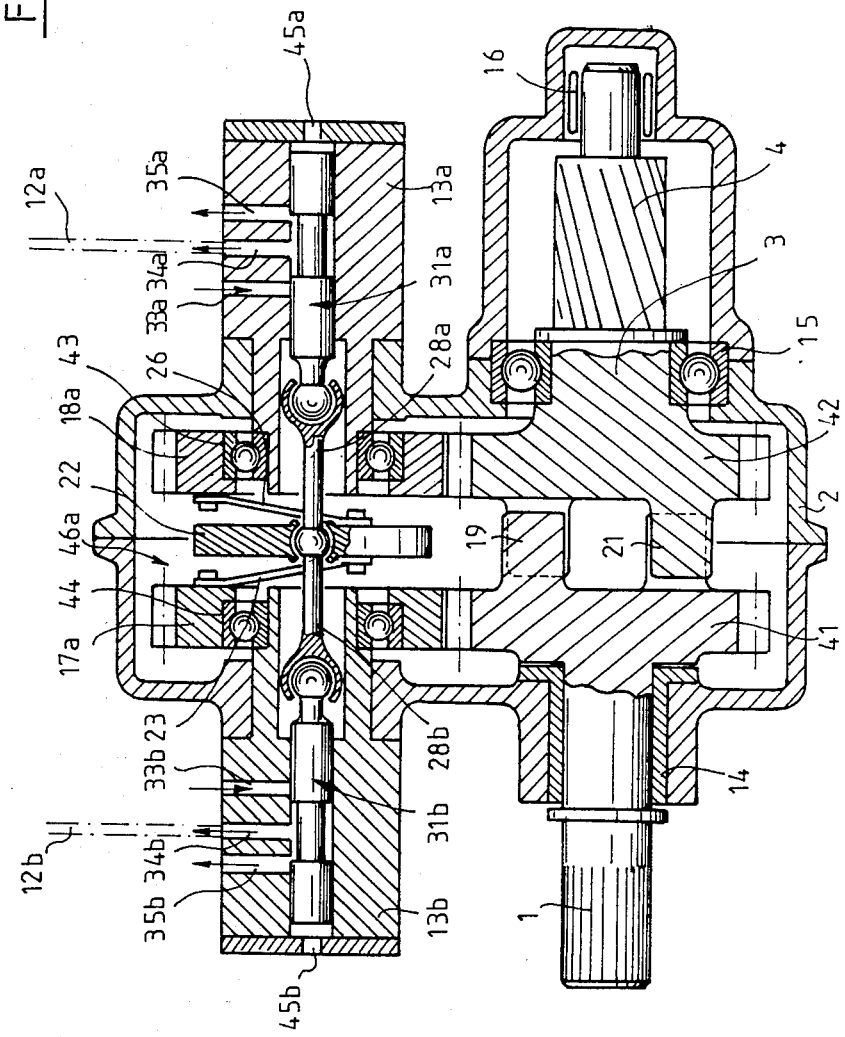

HYDRAULIC ASSISTED STEERING FOR MOTOR VEHICLES

FIELD OF THE INVENTION

The present invention relates to hydraulic assisted steering for motor vehicles comprising a control shaft mounted for rotation in a case or housing and connected to the steering wheel, a follower shaft mounted for pivoting in this case or housing and connected mechanically to a pinion engaged with the steering rack, resilient means connecting the control shaft and the follower shaft together so that a relative angular movement of the two shafts occurs when a torque is exerted on the control shaft, a hydraulic distributor responsive to this relative movement and a hydraulic assisting cylinder in the supply line of which the distributor is inserted and whose mobile element is connected to the rack.

BACKGROUND OF THE INVENTION

European Pat. No. 0 072 712 describes hydraulic assisted steering means for motor vehicles comprising a control shaft connected to the steering wheel and connected by a torsion bar to a follower shaft which carries a pinion engaged with the steering rack. Parts of the control shaft and of the follower shaft form the elements of a rotary distributor or valve which is inserted in the supply line of a hydraulic assist cylinder. When the driver exerts a torque on the steering wheel, the control shaft pivots resiliently with respect to the follower shaft so that the valve is actuated and sends fluid to the assisting cylinder so as to move the steering rack in the direction corresponding to the direction of rotation of the steering wheel.

Assisted steering means are also known in which the valve is a more reliable slide valve. But the use of a slide valve in the assisted steering known from the above European patent has technical problems, for it is difficult and complicated, in this assisted steering, to transform the relative angular movement of the two control and follower shafts into a translational movement of the valve.

OBJECT OF THE INVENTION

The object of the present invention is to provide hydraulic assisted steering means for a motor vehicle of the above mentioned type which comprises a slide valve and in which the movement of the slide of the valve is, provided in a very simple way.

In the assisted steering of the invention, said resilient means connecting the control shaft and the follower shaft together and detecting the torque exerted on the control shaft comprise a first endmost transmission element interlocked for rotation with the control shaft, a second endmost transmission element interlocked for rotation with the follower shaft and coaxial with the first element, and a third intermediate transmission element which is coaxial with the first two and is connected peripherally thereto by means of flexible blades directed obliquely, in one direction for the first endmost element and in the opposite direction for the second, the intermediate element being connected to an axial transmission shaft which passes through one of the endmost elements and is itself connected to the slide of the valve.

When a torque is exerted on the control shaft, this torque is transmitted by the flexible blades to the intermediate element which transmits it in its turn to the follower shaft. During its transmission, the flexible blades connecting the intermediate element to one of the endmost elements increase in slant whereas those connecting this intermediate element to the other endmost element straighten up. Consequently, the intermediate element moves axially, in one direction or the other depending on the direction of the torque, while drawing close to one of the endmost elements and moving away from the other. This intermediate element drives the slide of the valve so that the assisting hydraulic cylinder is brought into service and causes the follower shaft to pivot in the same direction as the control shaft until the torque has disappeared.

The transmission elements may be formed by disks or plates.

The endmost transmission elements may be respectively integral with the control shaft and with the follower shaft. They may also be connected to these shafts by gears.

The two control and follower shafts may be coaxial and the valve or distributor may be fixed to the case in the axis of these two shafts, on the side opposite the control shaft with respect to the follower shaft, the transmission shaft passing through an axial bore in the follower shaft. Thus assisted steering is obtained which is particularly simple and compact. The body of the valve may also be formed by the control shaft, its slide being mounted for sliding in an axial bore in this shaft.

In the case where the transmission elements are connected by gears to the control shaft and to the follower shaft, the valve may be fixed to the case coaxially with respect to the transmission elements. In another arrangement, the valve may be formed from two half valves disposed on each side of the transmission elements and whose slides are connected to the intermediate element by two independent shafts which each pass through one of the endmost transmission elements. It is then possible to apply to the two free faces of the slides, and in a balanced way, a counter pressure modulated as a function of a parameter, for example the speed of the vehicle.

Preferably, a ball joint is provided between the slide of the valve and the transmission shaft connected to the intermediate element so as to accommodate any possible misalignment of the axes.

BRIEF DESCRIPTION OF THE DRAWING

Different embodiments of the assisted steering of the invention will be described hereafter by way of non-limitative examples, with reference to the accompanying drawing in which:

FIG. 2 is an axial sectional view of the assistance or housing and the structure therein, in a first embodiment;

FIG. 3 is a cross section along line III—III of FIG. 2;

FIG. 4 is a diagrammatic perspective view showing the intermediate transmission elements and the flexible blades which are fixed thereto;

FIG. 5 shows in axial section a detail of FIG. 2, when a torque is exerted on the control shaft;

FIG. 7 is an axial sectional view of the assistance casing, in a third embodiment in which the endmost transmission elements are connected by gears to the control and follower shafts; and FIG. 8 is a view similar to FIG. 7, in which two half views are provided.

SPECIFIC DESCRIPTION

Figure 1:
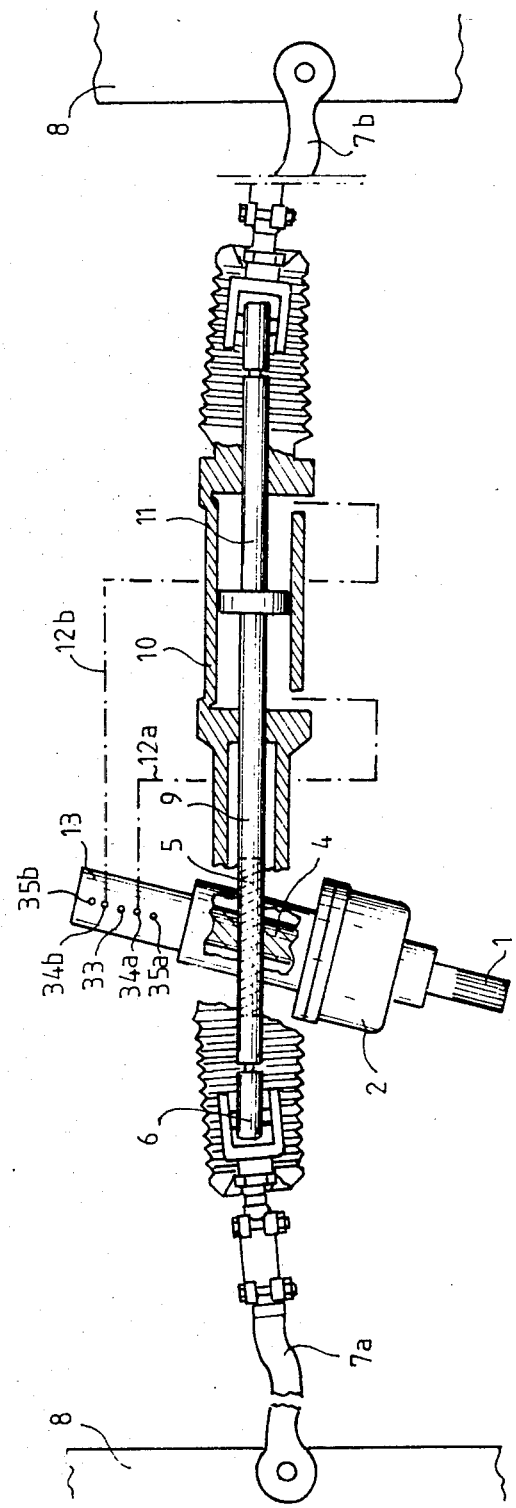
FIG. 1 is a diagrammatic elevation of the assisted steering partly in section.

In the assisted steering shown schematically in FIG. 1, a shaft 1 connected to the steering column is mounted for rotation in a casing 2 and is connected as will be described further below to a follower shaft 3 coaxial with shaft 1, carrying a pinion 4 and also mounted for rotation in casing 2. This pinion is engaged with a rack 5 one of the ends of which pivotally connected at 6 to a linkage 7a connected to one of the steerable wheels 8 of the vehicle. The other end of the rack is connected to one of the piston rods 9 of a double acting assisting hydraulic cylinder 10 whose other piston rod 11 is pivotably connected by a linkage 7b to the other steerable wheel 8. Hydraulic cylinder 10 is connected by ducts 12a and 12b to a slide valve 13 coaxial with shafts 1 and 2 and fixed to casing 2, on the side opposite the control shaft 1, with respect to the follower shaft 3.

As can be seen more particularly in FIG. 2, shaft 1 is mounted for rotation in case 2 by means of an antifriction bearing 14. For its part, the follower shaft is mounted for rotation in the casing by means of a ball bearing 15 and a needle bearing 16. The two shafts 1 and 3 carry end plates 17 and 18, respectively which are parallel and disposed facing each other. Plate 17 has lugs 19 between which are engaged lugs 21 of plate 18 with play 20. Should the assisting system fail, shaft 1 may thus, after taking up the play 20, drive the follower shaft 3, the pinion 4 and the steering rack 5.

Between plate 17 and 18 is located a third plate 22 parallel to plate 17 and 18 and connected to plate 17 by resilient calibrated blades 23 which are here three in number and offset from each other by 120° about the axis of the steering column. These blades are fixed at one of their ends at 24 to the periphery of plate 17 and at their opposite end at 25 to the periphery of plate 22, for example by means of rivets or screws or by anchoring. They are disposed obliquely not only with respect to the plane of plate 22 but also with respect to the radii passing through their fixing point 25 on this plate.

Similarly, plates 18 and 22 are joined together by calibrated resilient blades 26 which are disposed obliquely while being fixed at 25 to the periphery of plate 22 and at 27 to the periphery of plate 18.

Blades 26 are disposed in contrary direction with respect to blades 23, that is to say that two blades 23 and 26 fixed at the same position 25 on the intermediate plate 22 form with each other a V, symmetrically with respect to this intermediate plate 22. Plates 17, 18 and 22 and resilient blades 23 and 26 form a device 46 which serves both for detecting the torque exerted on shaft 1 and for the resilient connecting of this shaft with shaft 3.

A rod 28 passes through an axial bore in the follower shaft 3. It is connected by ball and socket joint 29 to plate 22 and by a ball and socket joint 30 to the slide 31 of the slide valve 13.

Valve 13 is adapted according to the so called "closed center" arrangement which is suitable when the vehicle is equipped with a regulated pressurized oil reservoir. Slide 31 comprises three lands 32a, 32b and 32c which cooperate with a central bore 33 connected to the pressurized reservoir, two bores 34a and 34b connected to the user ducts 12a and 12b and two bores 35a and 35b connected to the exhaust side.

In FIG. 2, valve 13 is in a balanced position. The high pressure circuit is isolated by land 32b of the slide and the user ducts 12a and 12b are connected respectively to the exhaust bores 35a and 35b. Longitudinal movement of slide 31 in one direction or in the other, from its balanced position, results in isolating one of the exhaust circuits and connecting the corresponding user circuit to the high pressure while the other user circuit remains connected to exhaust.

But valve 13 could also be adapted to the "open center" arrangement, in the case where the supply is provided by a continuous operation oil pump.

When the driver turns the steering wheel and thus causes shaft 1 to pivot, the torque exerted on plate or member 17 causes an axial movement of plate or intermediate element 22. If the torque is exerted in the direction of blades 23 the plate pushes these plates back, which relax. Plate 22 moves while driving rod 28 which moves axially towards the valve 13 (FIG. 5). Plate 22 in its turn pushes back blades 26 which bend. If the torque is exerted in the opposite direction, plate 22 and rod 28 move away from valve 13.

Since blades 23 bend when blades 26 straighten up, and conversely, not only blades 23 but also blades 26 play a part in ensuring the resilient connections between the control shaft and the follower shaft 3.

When plate 26 moves with rod or transmission shaft 28, this latter drives the slide 31 of the valve. One of the user ducts 12a or 12b is placed in communcation with the high pressure so that the piston or cylinder 10 moves and drives rack 5 and so the steering linkage. Pinion 4 pivots and drives plate or member 18 which tends to take up its original angular position with respect to plate 17. Shaft 3 thus follows the pivoting movement of shaft 1.

When the torque ceases to be exerted on control shaft 1, plate 22 takes up its neutral position again and the two user circuits 12a and 12b are again both isolated so that the steering rack 5 remains in the position into which has been brought.

Figure 6:
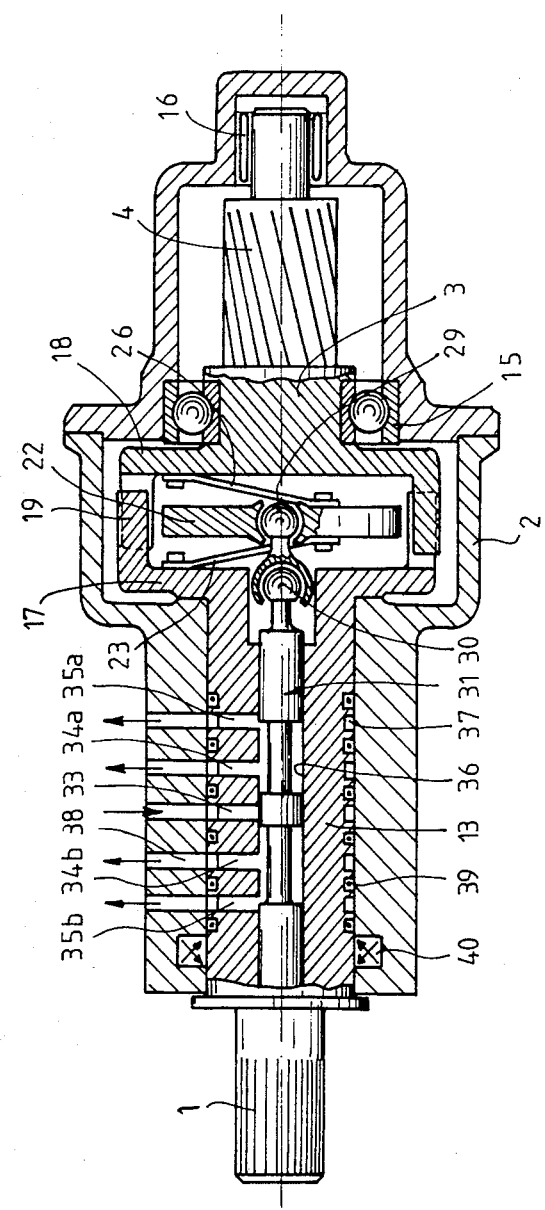
FIG. 6 is an axial sectional view of the assistance casing, in a second embodiment.

In the embodiment shown in FIG. 6, valve 13 is formed in shaft 1. This latter comprises an axial bore 36 in which slide 31 is slidably mounted, as well as radial bores 33, 34a and 34b, and 35a and 35b, which open into grooves 37 located opposite radial bores 38 in case 1, sealing being provided between the grooves by O seals 39 and, with respect to the outside, by a lipped seal 40.

In the embodiment shown in FIG. 7, shafts 1 and 3 are fixed to pinions respectively 41 and 42 which have lugs 19 and 21. The two pinions 41 and 42 are engaged respectively with coaxial plates 17a and 18a of the torque detector 46a, which are toothed at their periphery; valve 13 is coaxial to these plates. Plate 18a is supported by casing 2 by means of a bearing 43, whereas plate 17a is supported by valve 13 by means of a bearing 44. The intermediate plate 22 is, as in the preceding embodiments, connected by flexible blades 23 and 26 to plates 17a and 18a and by link 28 to the slide 31 of valve 13.

FIG. 8 shows a variant of the embodiment of FIG. 7, in which valve 13 has been replaced by two semi-valves 13a and 13b disposed on each side of the torque detector 46a and each comprising a semi-slide 31a or 31b connected to plate 22 by a link 28a or 28b.

The lands of slide 31a cooperate with a bore 33a connected to the pressurized reservoir, a bore 34a connected to the user duct 12a and a bore 35a connected to exhaust. Similarly, the lands of slide 31b cooperate with a bore 33b connected to the pressurized reservoir, a bore 33b connected to duct 12b and a bore 35b connected to exhaust.

The bore of each semi-valve is, on the same side as the free face of the semi-valve, in communication through a bore 45a or 45b with a counter pressure source modulated as a function of a given parameter, for example the speed of the vehicle. That allows for the force applied to the steering wheel to be increased for the same turning angle, when the speed of the vehicle increases.

It goes without saying that the present invention should not be considered as limited to the embodiments described and shown but covers, on the contrary, all variants thereof.

I claim:

1. A hydraulic-assist steering apparatus for an automotive vehicle having steerable wheels, a steering linkage connected to said wheels, and a hydraulic-assist cylinder connected to said wheels and adapted to be supplied with fluid for hydraulically displacing said linkage, said apparatus comprising in combination:
   a housing;
   a control shaft in said housing rotatable to initiate steering movement of said wheels;
   a follower shaft positioned in said housing so as to be rotatably entrained by rotation of said control shaft, but with freedom of limited relative angular displacement therebetween, each of said shafts being operatively connected rotationally with a respective one of a pair of axially juxtaposed relatively rotatable members in said housing;
   an intermediate element axially juxtaposed in said housing with said members and received between them with freedom of axial movement relative to said members;
   a plurality of first elongated flexible blades in said housing oriented obliquely in one rotational direction and peripherally coupling said intermediate element to one of said members, and a plurality of second elongated flexible blades in said housing oriented obliquely in an opposite rotational direction and peripherally coupling said intermediate element to the other of said members, whereby upon relative angular displacement of said shafts said intermediate element moves axially toward one or the other of said members depending upon the direction of said relative angular displacement;
   a slide valve having a moveable valve slide on said housing axially aligned with said members and said element; and
   means in said housing axially connecting said slide with said intermediate element.

2. The hydraulic assist steering apparatus as defined in claim 1 wherein said members are generally disc shaped.

3. The hydraulic assist steering apparatus as defined in claim 1 wherein said members are integral with said shafts respectively.

4. The hydraulic assist steering apparatus as defined in claim 1 wherein said members are connected to said shafts by gears.

5. The hydraulic assist steering apparatus as defined in claim 1 wherein said shafts are coaxial.

6. The hydraulic assist steering apparatus as defined in claim 5 wherein said valve is affixed to said housing along a common axis of said shafts on a side of said housing opposite the control shaft with respect to the follower shaft, said means in said housing axially connecting said slide with said intermediate element being a transmission shaft axially passing through an axial bore formed in said follower shaft.

7. The hydraulic assist steering apparatus as defined in claim 1 wherein said valve is formed in said control shaft and said slide is mounted for axial movement in an axial bore formed in said control shaft.

8. The hydraulic assist steering apparatus as defined in claim 1 wherein said valve is affixed to said housing coaxially with said members and said element.

9. The hydraulic assist steering apparatus as defined in claim 8 wherein said valve consists of two semi-valves disposed on opposite sides of said members and having slides connected to said intermediate element by respective shafts passing through respective ones of said members.

10. The hydraulic assist steering apparatus as defined in claim 8 further comprising means for applying a pressure to at least one of said semi-valves which is a function of the speed of said vehicle.

11. The hydraulic assist steering apparatus as defined in claim 1 wherein said means in said housing axially connecting said slide with said intermediate element includes a ball joint between said slide and said intermediate element.

* * * * *